(12) United States Patent
Reed

(10) Patent No.: US 12,214,752 B2
(45) Date of Patent: Feb. 4, 2025

(54) VEHICLE MOUNTABLE ARTICLE DRYER SYSTEM

(71) Applicant: Dana Lynn Reed, Highland, MD (US)

(72) Inventor: Dana Lynn Reed, Highland, MD (US)

(*) Notice: Subject to any disclaimer, the term of this patent is extended or adjusted under 35 U.S.C. 154(b) by 0 days.

(21) Appl. No.: 18/619,100

(22) Filed: Mar. 27, 2024

(65) Prior Publication Data

US 2024/0326706 A1 Oct. 3, 2024

Related U.S. Application Data

(60) Provisional application No. 63/492,613, filed on Mar. 28, 2023.

(51) Int. Cl.
*B60R 9/06* (2006.01)
*B60R 11/00* (2006.01)

(52) U.S. Cl.
CPC ....... *B60R 9/065* (2013.01); *B60R 2011/0056* (2013.01)

(58) Field of Classification Search
CPC .................. B60R 9/065; B60R 2011/0056
USPC ........ 220/601, 553; 224/42.4, 328; 119/496, 119/498, 500, 501; 34/202
See application file for complete search history.

(56) References Cited

U.S. PATENT DOCUMENTS

| | | | | |
|---|---|---|---|---|
| 2,721,718 A | * | 10/1955 | Wagner | A01K 97/05 248/223.41 |
| 2,897,781 A | * | 8/1959 | Olson | B60R 9/065 137/484.4 |
| 3,565,305 A | * | 2/1971 | Belokin, Jr. | B60R 9/065 224/319 |
| 4,383,385 A | * | 5/1983 | Myers | A01K 97/06 229/5.5 |
| 4,429,928 A | * | 2/1984 | Sullivan | D06F 58/14 34/239 |
| 4,546,728 A | * | 10/1985 | May | A01K 1/0272 119/496 |
| 4,805,859 A | * | 2/1989 | Hudson | B63B 29/06 224/406 |
| 4,848,628 A | * | 7/1989 | Lopez | B60R 9/065 410/97 |
| 4,941,602 A | * | 7/1990 | Wells | B60R 9/02 224/560 |
| 4,957,228 A | * | 9/1990 | Balka | B60R 9/065 224/493 |
| 5,016,570 A | * | 5/1991 | Henson | A01K 31/08 119/497 |

(Continued)

*Primary Examiner* — Justin M Larson
(74) *Attorney, Agent, or Firm* — Grandview Law

(57) ABSTRACT

An article dryer system removably couples to an exterior of a vehicle. The article dryer system includes (I) a receptacle assembly including (A) a bottom portion, (B) a top portion spaced from the bottom portion, (C) a first side portion extending between the bottom portion and the top portion, and (D) a second side portion extending between the bottom portion and the top portion, the second side portion spaced from the first side portion. The bottom portion, the top portion, the first side portion, and the second side portion partially bound an interior area having an inlet opening and outlet opening. The article dryer system also includes (II) at least one coupler for coupling to the exterior of the vehicle with the coupler coupled to the receptacle assembly. Other aspects are described in the claims, drawings, and text forming a part of the present disclosure.

2 Claims, 18 Drawing Sheets

(56) References Cited

U.S. PATENT DOCUMENTS

| | | | | |
|---|---|---|---|---|
| 5,240,214 A * | 8/1993 | Birnbaum | F16M 11/12 | 248/214 |
| 5,320,065 A * | 6/1994 | Leopold | A01K 1/035 | 229/120.32 |
| 5,323,897 A * | 6/1994 | Sperber | D06F 95/002 | 383/117 |
| 5,348,207 A * | 9/1994 | Frank | B60R 9/055 | 224/310 |
| 5,395,019 A * | 3/1995 | Christensen | B60R 11/06 | 224/406 |
| 5,528,840 A * | 6/1996 | Pajak | A47L 23/20 | 34/235 |
| 5,666,743 A * | 9/1997 | Dawson | A47L 23/205 | 34/202 |
| 5,930,915 A * | 8/1999 | Dhaemers | F26B 9/006 | 34/235 |
| 5,987,773 A * | 11/1999 | Lipscy | A47L 23/20 | 34/106 |
| 6,053,401 A * | 4/2000 | Andrews, Sr. | B65D 81/3261 | 229/122 |
| 6,302,051 B1 * | 10/2001 | Hemmingson | B63B 34/60 | 224/406 |
| 6,780,101 B2 * | 8/2004 | Buhler | D06F 58/203 | 34/437 |
| 6,845,895 B2 * | 1/2005 | Jones | A45C 9/00 | 224/330 |
| 7,258,260 B2 * | 8/2007 | Hurd | B60R 9/055 | 224/325 |
| 7,628,120 B2 * | 12/2009 | Beeler | A01K 1/0281 | 119/500 |
| 8,061,571 B2 * | 11/2011 | Aghajanian | B60R 9/06 | 224/527 |
| 8,726,534 B2 * | 5/2014 | Chappell | F26B 9/003 | 34/232 |
| 8,770,396 B2 * | 7/2014 | Salys | A42B 3/006 | 383/33 |
| 8,789,288 B2 * | 7/2014 | Lim | D06F 29/005 | 34/508 |
| 9,015,955 B2 * | 4/2015 | Vezina | D06F 59/02 | 248/163.1 |
| 9,150,158 B2 * | 10/2015 | Reiber | B60R 9/055 | |
| 10,112,546 B1 * | 10/2018 | Hall | B60R 9/065 | |
| 10,865,514 B2 * | 12/2020 | Schwab | F26B 21/008 | |
| 11,535,168 B2 * | 12/2022 | Dunn | B60R 9/065 | |
| 11,771,191 B2 * | 10/2023 | Webb | D06F 58/14 | 224/575 |
| 2003/0168879 A1 * | 9/2003 | Grudek | B60P 3/40 | 296/100.15 |
| 2009/0308902 A1 * | 12/2009 | Rex | B60R 9/055 | 224/315 |
| 2011/0011342 A1 * | 1/2011 | Williams | A01K 1/0245 | 119/6.5 |
| 2011/0203528 A1 * | 8/2011 | Northrop | A01K 1/033 | 119/497 |
| 2014/0331513 A1 * | 11/2014 | Nguyen | A47L 23/205 | 34/104 |
| 2014/0352626 A1 * | 12/2014 | Kellogg | A01K 1/033 | 119/498 |
| 2014/0361060 A1 * | 12/2014 | Yang | B60R 9/055 | 224/328 |
| 2016/0057969 A1 * | 3/2016 | Kellogg | A01K 1/034 | 119/474 |
| 2018/0127150 A1 * | 5/2018 | Adanur | B65D 21/0215 | |
| 2022/0347333 A1 * | 11/2022 | Monaco | D06F 58/10 | |
| 2023/0225285 A1 * | 7/2023 | Levin | A01K 1/0245 | 119/500 |
| 2023/0263127 A1 * | 8/2023 | Rivas | A01K 1/0272 | 119/496 |
| 2023/0301290 A1 * | 9/2023 | Rector | B60R 9/055 | |

* cited by examiner

VEHICLE MOUNTABLE ARTICLE DRYER SYSTEM

SUMMARY

In one or more aspects an article dryer system for removably coupling to an exterior of a vehicle includes (I) a receptacle assembly including (A) a bottom portion, (B) a top portion spaced from the bottom portion, (C) a first side portion extending between the bottom portion and the top portion, and (D) a second side portion extending between the bottom portion and the top portion, the second side portion spaced from the first side portion, wherein the bottom portion, the top portion, the first side portion, and the second side portion partially bound an interior area having an inlet opening and outlet opening; and (II) at least one coupler for coupling to the exterior of the vehicle, wherein the coupler is coupled to the receptacle assembly. Further including a screen cover removably coupled to the receptacle assembly and at least partially positioned in the inlet opening. Wherein the screen cover portion is removably coupled to the receptacle assembly with a zipper assembly. Further including a screen cover portion removably coupled to the receptacle assembly and at least partially positioned in the outlet opening. Further including a grille cover portion removably coupled to the receptacle assembly and at least partially positioned in the inlet opening. Further including a solid cover portion removably coupled to the receptacle assembly and partially positioned in the outlet opening. Further including a screen cover portion removably coupled to the receptacle assembly and partially positioned in the outlet opening. Wherein the receptacle assembly includes a rigid thermoplastic material. Wherein the receptacle assembly includes a semirigid fabric material. Further including a divider panel positioned in the interior area of the receptacle assembly, wherein the divider panel extends from the first side of the receptacle assembly to the second side of the receptacle assembly, wherein the divider panel includes a front edge and a rear edge, wherein the front edge of the divider panel is positioned closer to the inlet opening of the receptacle assembly than the rear edge of the divider panel is positioned to the inlet opening, and wherein the front edge of the divider panel is positioned closer to the bottom portion of the receptacle assembly than the rear edge of the divider panel is positioned to the bottom portion of the receptacle assembly. Wherein the divider panel includes a plurality of apertures. Wherein the rear edge of the divider panel is spaced from the top portion of receptacle assembly a first distance, and wherein a portion of portion of the divider panel extending from the rear edge of the divider panel is spaced from the top portion of the receptacle assembly the first distance. Wherein the at least one coupler includes at least one magnet. Wherein further including at least one elongated T-shaped member, wherein the at least one elongated T-shaped member is coupled to the bottom portion of the receptacle assembly. Wherein further including at least one rail member, wherein the at least one elongated T-shaped member is coupled with the at least one rail member, and wherein the at least one rail member is coupled to the at least one coupler. Wherein the at least one coupler includes at least one suction cup.

In one or more aspects an article dryer system for removably coupling to an exterior of a vehicle includes (I) a receptacle assembly including (A) a bottom portion, (B) a top portion spaced from the bottom portion, (C) a first side portion extending between the bottom portion and the top portion, and (D) a second side portion extending between the bottom portion and the top portion, the second side portion spaced from the first side portion, wherein the bottom portion, the top portion, the first side portion, and the second side portion partially bound an interior area having an inlet opening and outlet opening; and (II) a divider panel positioned in the interior area, extending from the first side portion to the second side portion, wherein the divider panel includes a front edge extending from the first side portion to the second side portion and a rear edge extending from the first side portion to the second side portion, the front edge positioned closer to the inlet opening than the rear edge is positioned to the inlet opening, wherein the rear edge divider panel is positioned closer to the top portion of the receptacle assembly than the front edge of the divider panel is positioned from the top portion of the receptacle assembly. Further including at least one coupler for removably coupling with the exterior of the vehicle, wherein the at least one coupler is coupled to the bottom of the receptacle assembly.

In one or more aspects an article dryer system for removably coupling to an exterior of a vehicle includes (I) a multi-sided tubular structure including an interior area, an inlet opening and an outlet opening; (II) a divider panel positioned in the interior area, extending from a first side portion of the multi-sided tubular structure to a second side portion of the multi-sided tubular structure, wherein the divider panel includes a front edge extending from the first side portion to the second side portion and a rear edge extending from the first side portion to the second side portion, the front edge of the divider panel is positioned closer to the inlet opening of the multi-sided tubular structure than the rear edge is positioned to the inlet opening of the multi-sided tubular structure, and wherein the rear edge divider panel is positioned closer to a top portion of the multi-sided tubular structure than the front edge of the divider panel is positioned from the top portion of the multi-sided tubular structure; and (III) at least one coupler for removably coupling with the exterior of the vehicle, wherein the at least one coupler is coupled to a bottom portion of the multi-sided tubular structure. Further including a porous cover removably coupled to the receptacle assembly and at least partially positioned in the inlet opening.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

Figure 1:
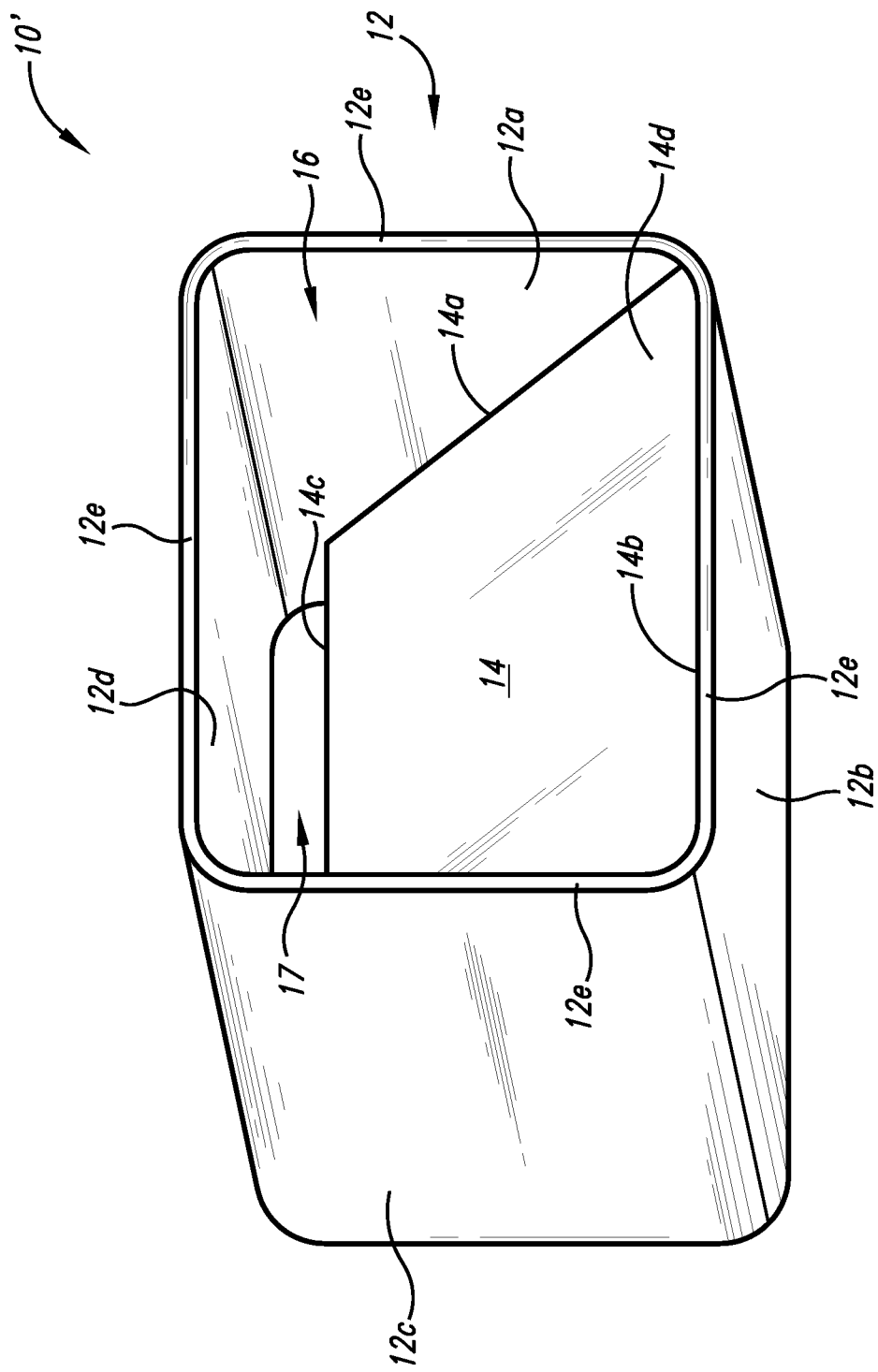
FIG. 1 is a front perspective view of a vehicle mountable article dryer system.

With reference now to the figures, shown are one or more examples of Vehicle Mountable Article Dryer System, articles of manufacture, compositions of matter for same that may provide context, for instance, in introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front perspective view of vehicle mountable article dryer system 10'. Depicted implementation of vehicle mountable article dryer system 10' is shown to include receptacle assembly 12, divider panel 14, inlet opening 16, and outlet opening 17. Depicted implementation of receptacle assembly 12 is shown to include side portion 12a and bottom portion 12b, side portion 12c, top portion 12d, (which form to bound an interior area as a multi-sided tubular structure), and front edge 12e. Depicted implementation of divider panel 14 is shown to include side edge 14a and front edge 14b, rear edge 14c, and front surface 14d.

Figure 2:
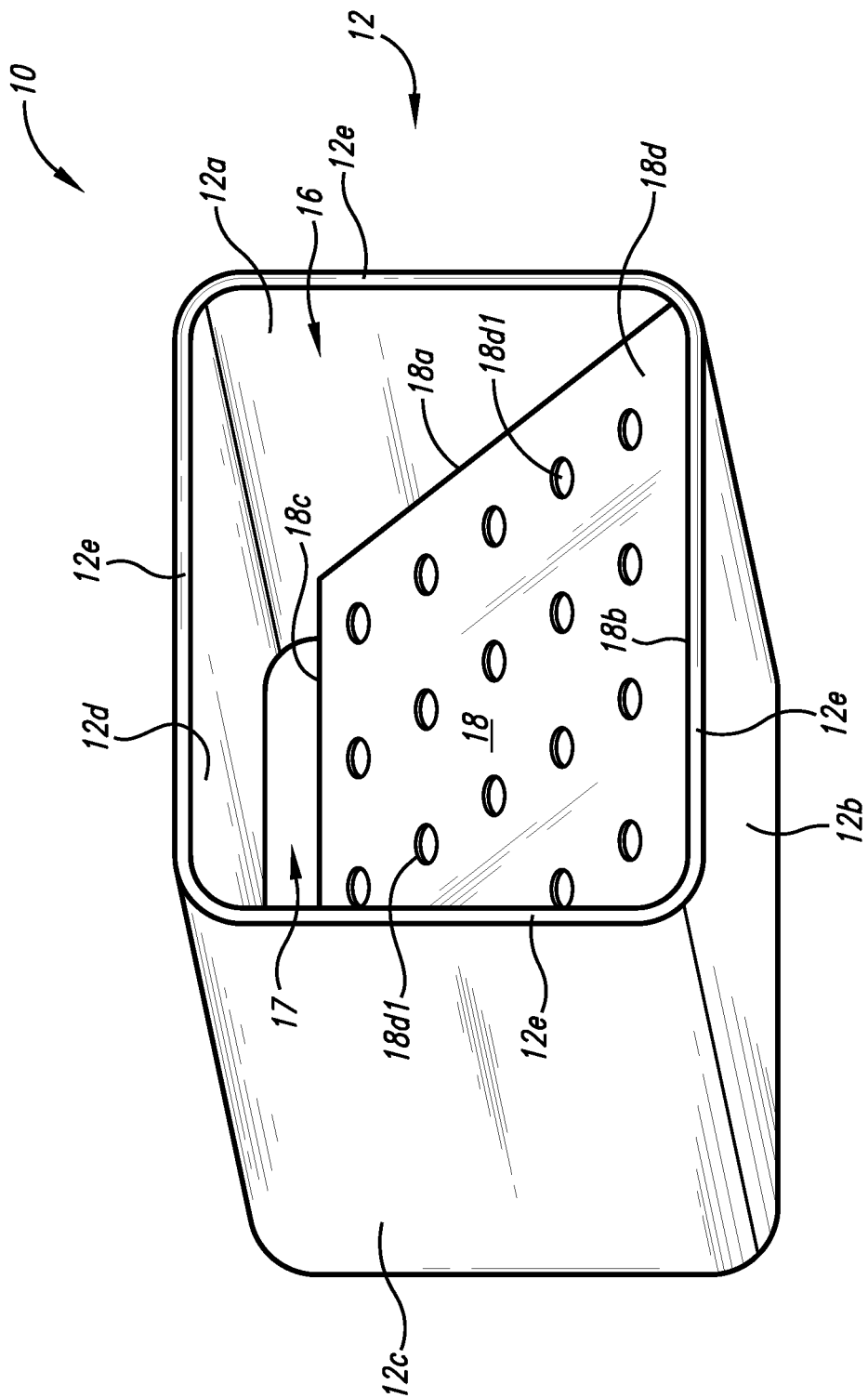
FIG. 2 is a front perspective view of a vehicle mountable article dryer system.

Turning to FIG. 2, depicted therein is a front perspective view of vehicle mountable article dryer system 10. Depicted implementation of vehicle mountable article dryer system 10 is shown to include divider panel 18 having side edge 18a, front edge 18b, rear edge 18c, front angular surface 18d with a plurality of apertures 18d1.

In implementations of vehicle mountable article dryer system 10' and vehicle mountable article dryer system 10, receptacle assembly 12 can be used to hold various moist or soaked articles to be dried through evaporative processes by coupling to an exterior surface of a vehicle such as an exterior portion of the vehicle's rooftop, side, hood, etc. (not shown) with front edge 12e facing forward so that as the vehicle moves forward air enters inlet opening 16 and exits outlet opening 17 with such airflow serving to dry articles contained by receptacle assembly 12. Such evaporative processes can also serve to alleviate possible undesirable odors that may have been caused by moisture evaporatively removed. Articles to be dried can include but are not limited to sporting equipment such as shin guards, padding, uniform portions, shoes, etc. Other articles can include clothing, garment material, other footwear articles, and other moisture containing items.

In implementations, receptacle assembly 12, divider panel 14, and divider panel 18 can be made from a rigid material such as a thermoplastic material including polyamide (nylon), acrylonitrile butadiene styrene (ABS), polycarbonate, polyethylene terephthalate, and polyurethane. In other implementations, receptacle assembly 12, divider panel 14, and divider panel 18 can be made from a semirigid material such as a fabric or corrugated material.

Figure 3:
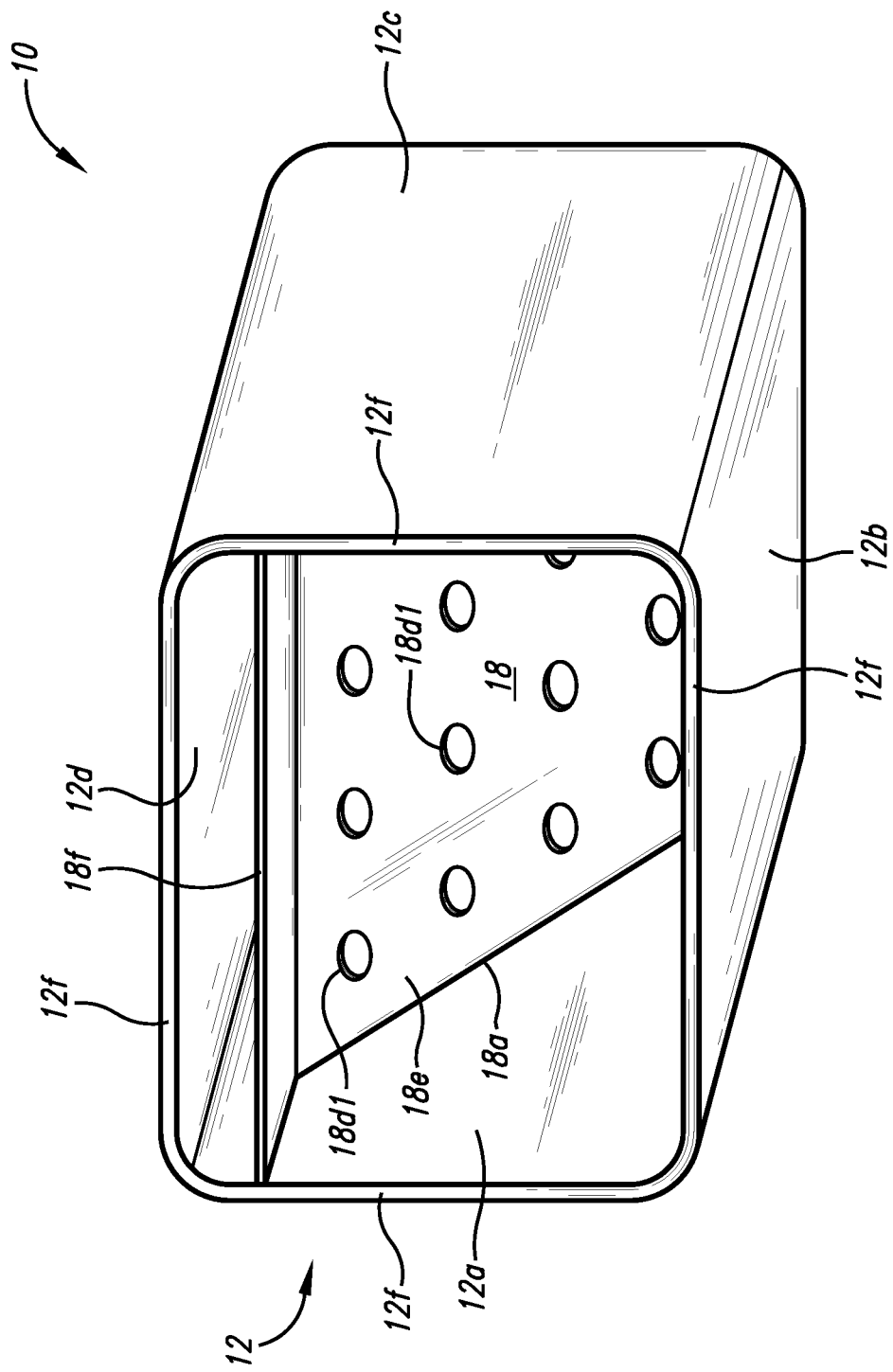
FIG. 3 is a rear perspective view of the vehicle mountable article dryer system of FIG. 2.

Turning to FIG. 3, depicted therein is a rear perspective view of vehicle mountable article dryer system 10. Depicted implementation of receptacle assembly 12 is shown to include rear edge 12f. Depicted implementation of divider panel 18 is shown to include rear angular surface 18e and horizontal portion 18f.

Figure 4:
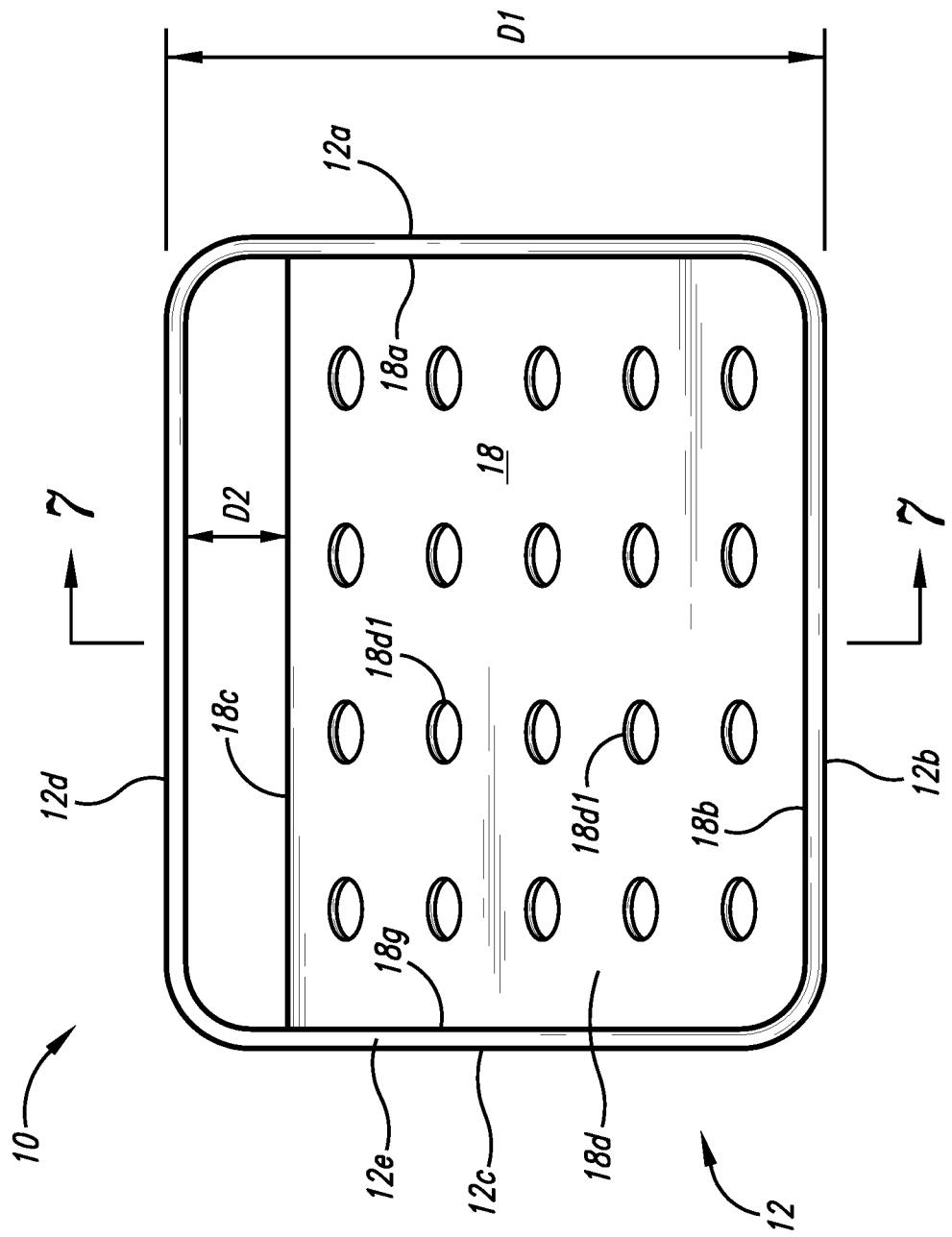
FIG. 4 is a front-elevational view of the vehicle mountable article dryer system of FIG. 2.

Turning to FIG. 4, depicted therein is a front-elevational view of vehicle mountable article dryer system 10 shown to include dimension D1 and dimension D2. In implementations divider panel 18 is shown to include side edge 18g.

Figure 5:
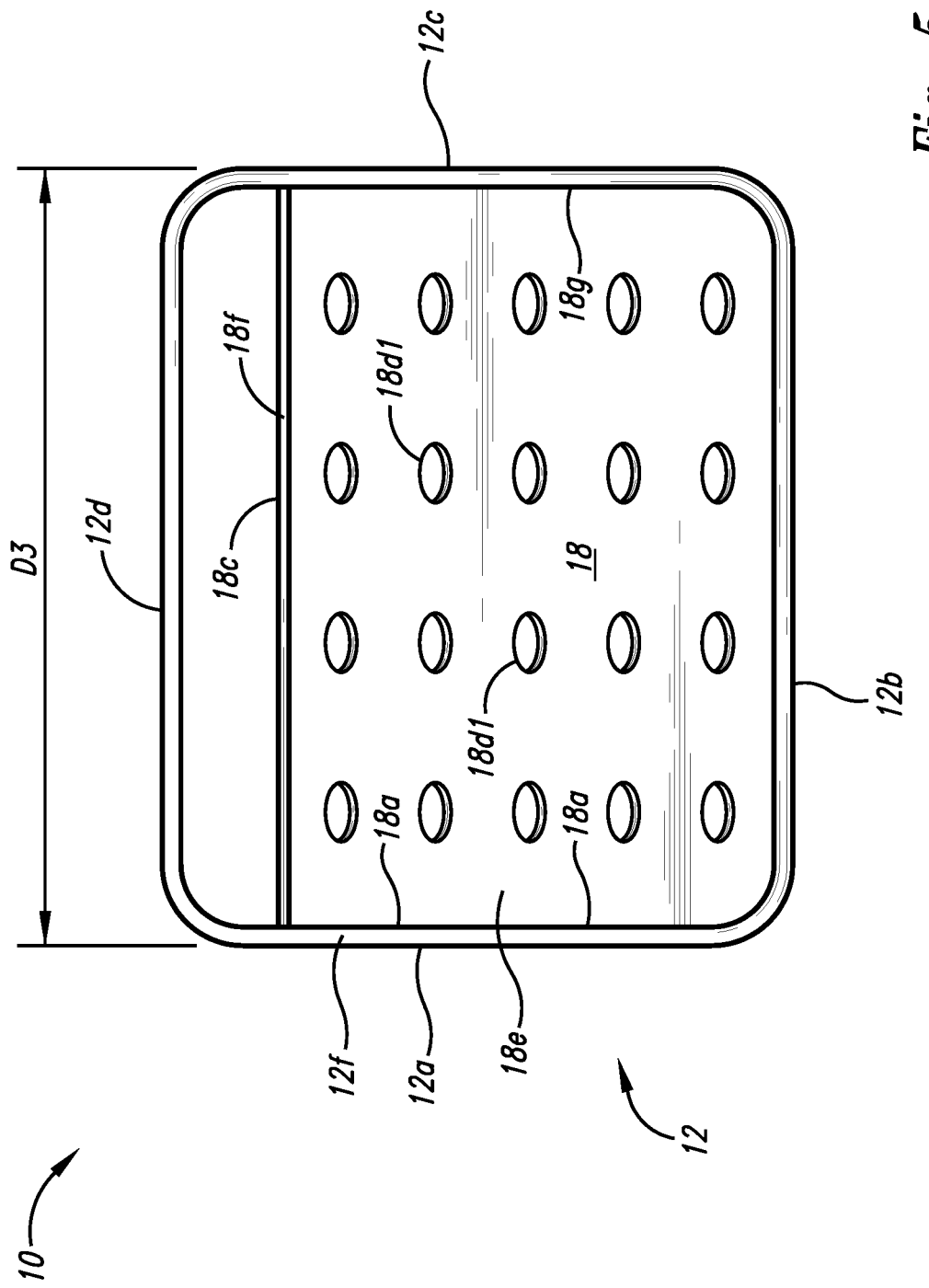
FIG. 5 is a rear-elevational view of the vehicle mountable article dryer system of FIG. 2.

Turning to FIG. 5, depicted therein is a rear-elevational view of vehicle mountable article dryer system 10 shown to include dimension D3.

Figure 6:
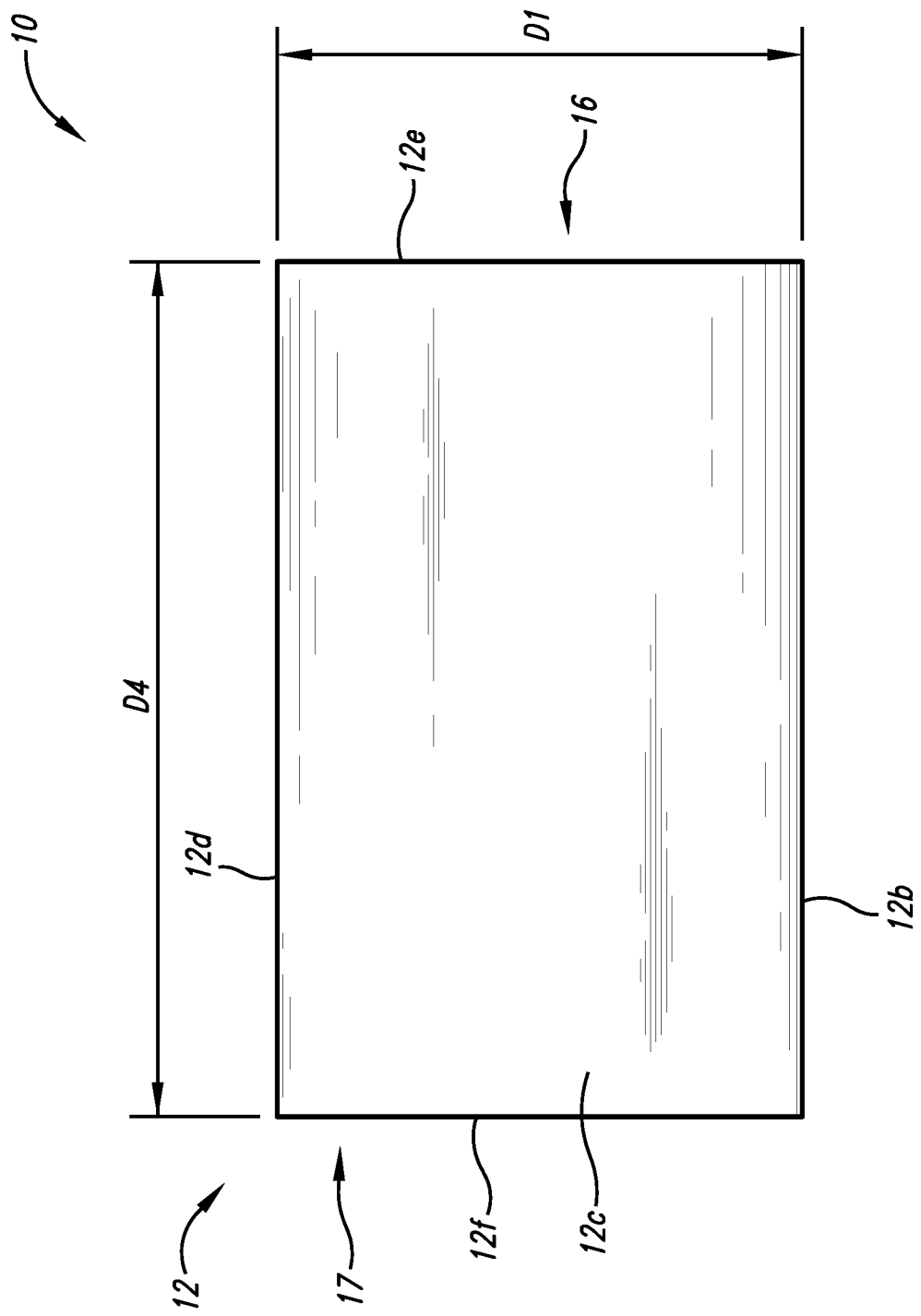
FIG. 6 is a side-elevational view of the vehicle mountable article dryer system of FIG. 2.

Turning to FIG. 6, depicted therein is a side-elevational view of vehicle mountable article dryer system 10 shown to include dimension D4.

Figure 7:
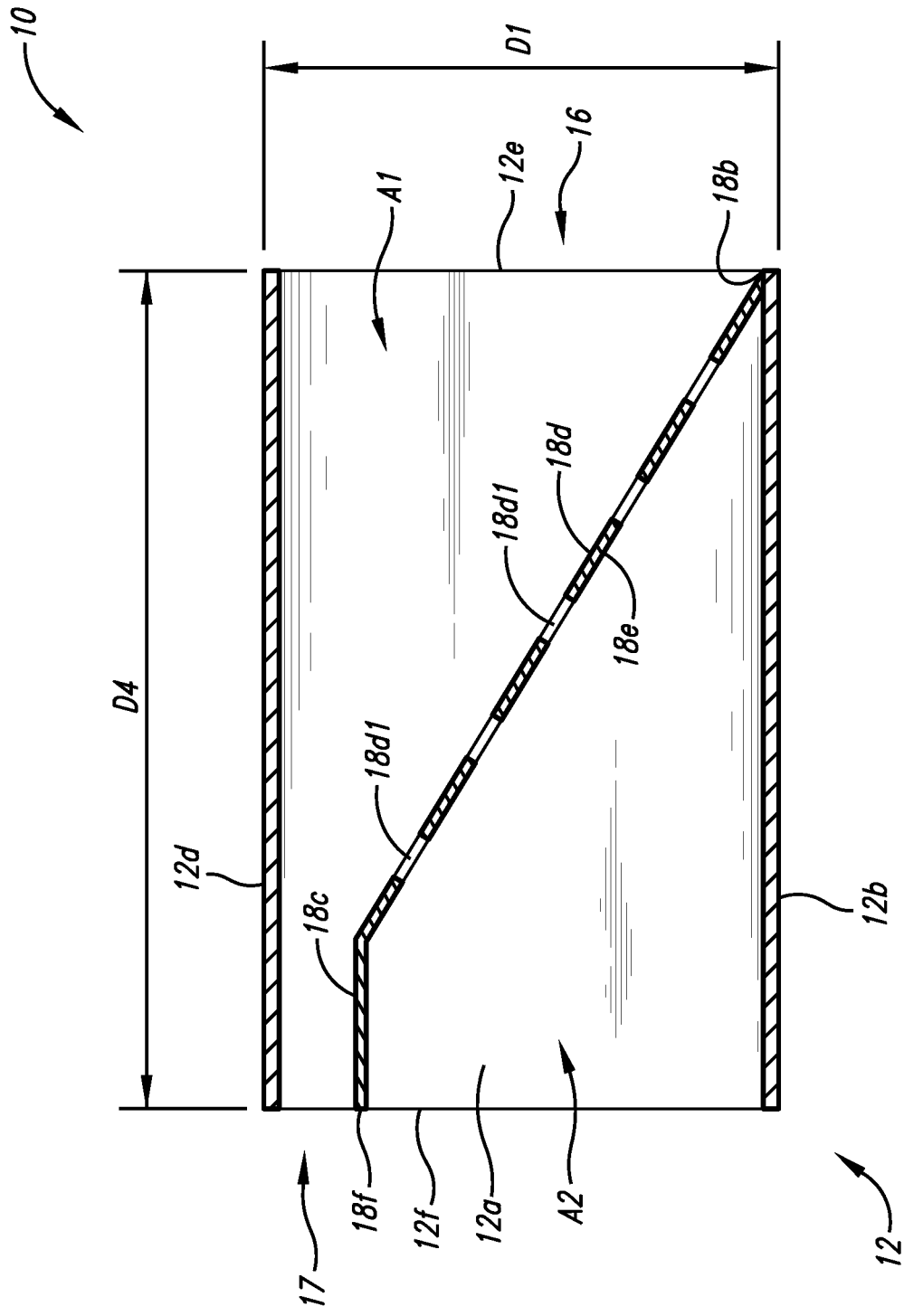
FIG. 7 is a cross-sectional side-elevational view of the vehicle mountable article dryer system of FIG. 2.

Turning to FIG. 7, depicted therein is a cross-sectional side-elevational view of vehicle mountable article dryer system 10 shown to include area A1 and area A2. During drying operation, articles for drying are generally preferably located in a lower portion of area A1 so as to not block outlet opening 17.

Figure 8:
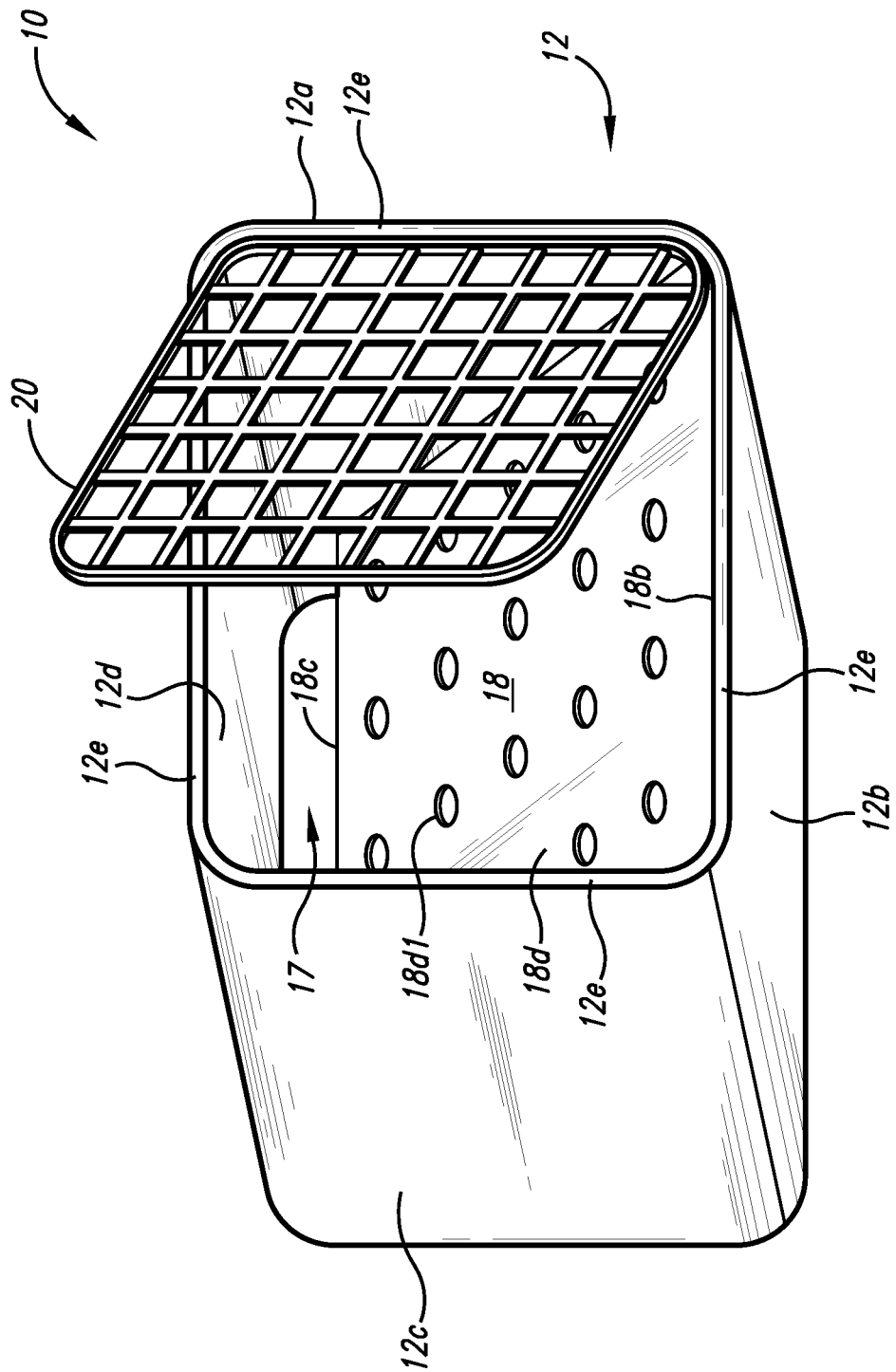
FIG. 8 is a front perspective view of the vehicle mountable article dryer system of FIG. 2 with front grille cover.

Turning to FIG. 8, depicted therein is a front perspective view of vehicle mountable article dryer system 10 with grille cover 20 (such as rubber-coated rigid-wire, etc.), which in implementations can be hinged, zippered, latched, or otherwise coupled to receptacle assembly 12.

Figure 9:
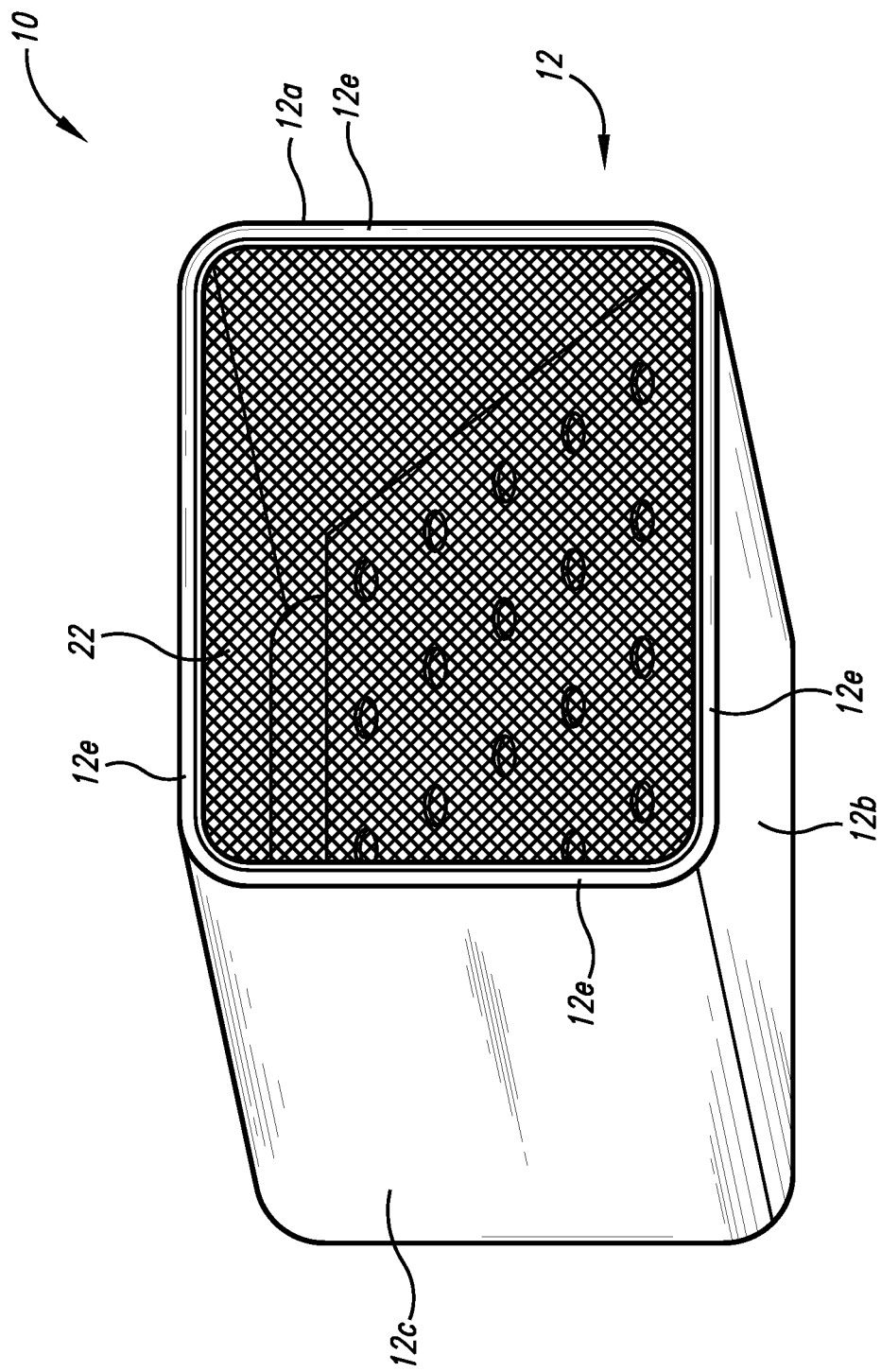
FIG. 9 is a front perspective view of the vehicle mountable article dryer system of FIG. 2 with front screen cover.

Turning to FIG. 9, depicted therein is a front perspective view of vehicle mountable article dryer system 10 with screen cover 22 (such as wire mesh, fabric screen, other porous materials, etc.), which in implementations can be hinged, zippered, latched, or otherwise coupled to receptacle assembly 12.

Figure 10:
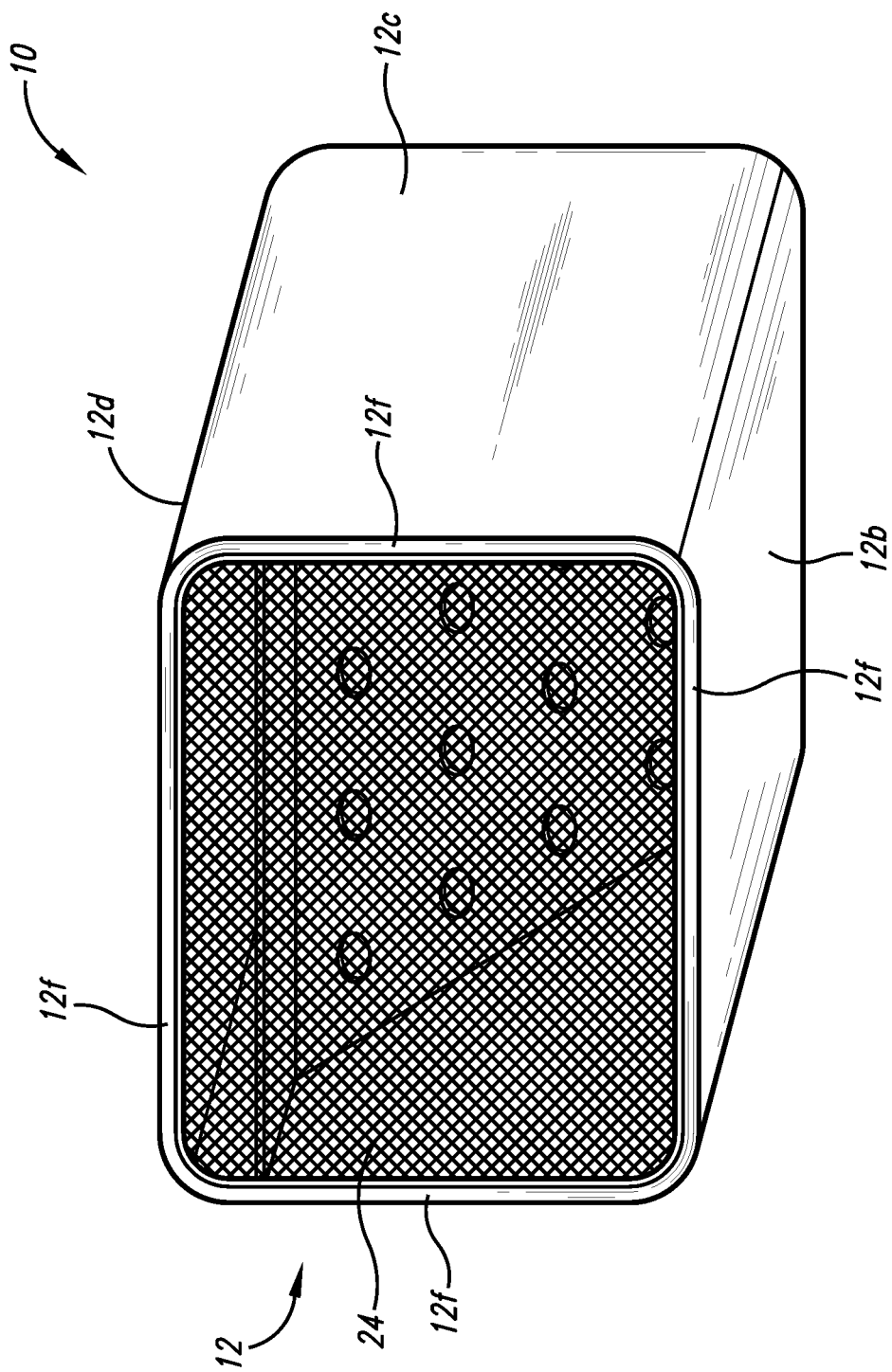
FIG. 10 is a rear perspective view of the vehicle mountable article dryer system of FIG. 2 with rear screen cover.

Turning to FIG. 10, depicted therein is a rear perspective view of vehicle mountable article dryer system 10 with screen cover 24 (such as wire mesh, fabric screen, other porous materials, etc.), which in implementations can be hinged, zippered, latched, seated in conforming grooves, fixedly attached, or otherwise coupled to receptacle assembly 12.

Figure 11:
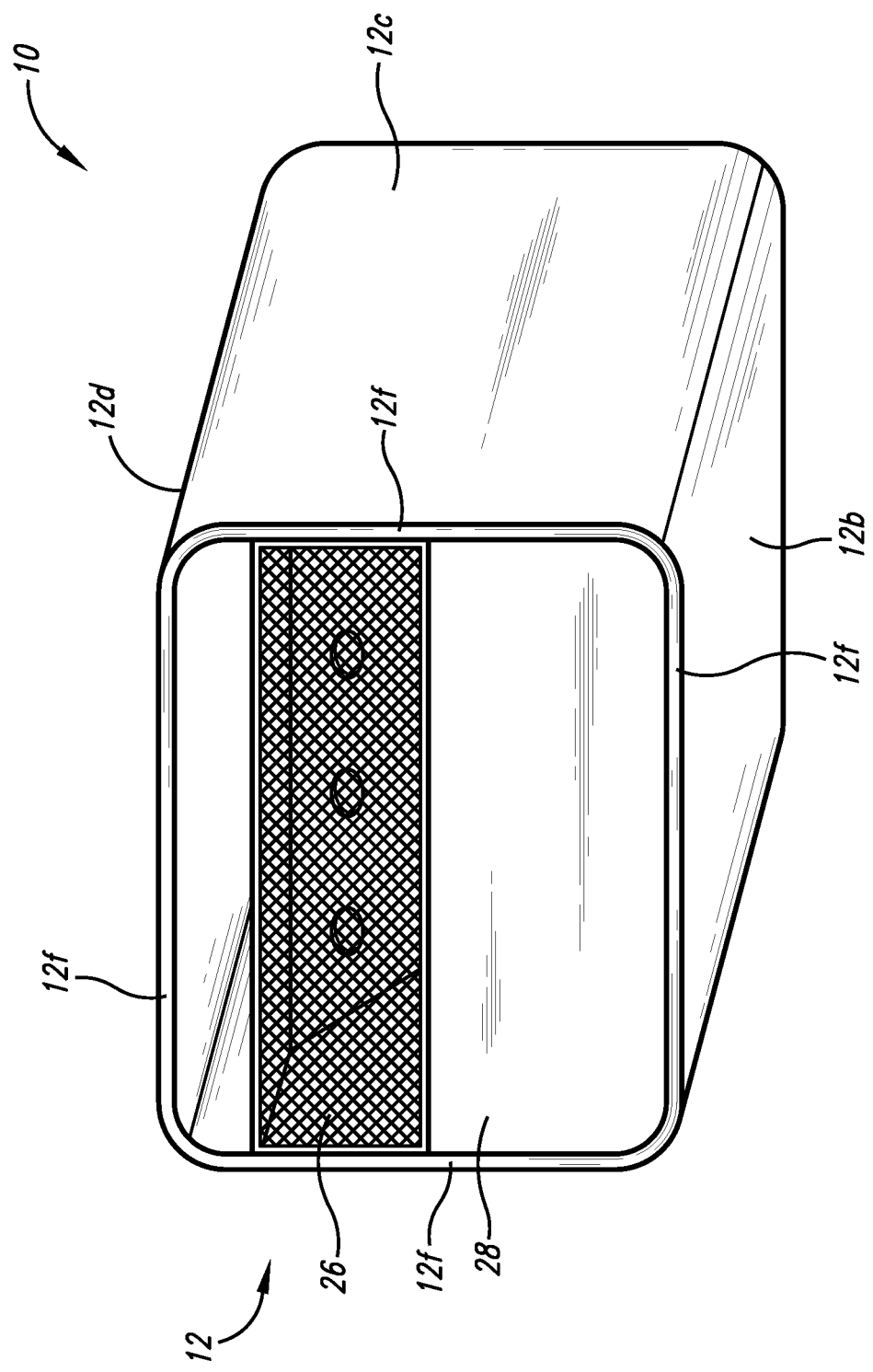
FIG. 11 is a rear perspective view of the vehicle mountable article dryer system of FIG. 2 with rear screen cover.

Turning to FIG. 11, depicted therein is a rear perspective view of vehicle mountable article dryer system 10 with screen cover portion 26 (such as wire mesh, fabric screen, other porous materials, etc.), and solid cover portion 28 (such as synthetic fabric, thermoplastic, etc.), both of which in implementations can be hinged, zippered, latched, seated in conforming grooves, fixedly attached, or otherwise coupled to receptacle assembly 12.

Figure 12:
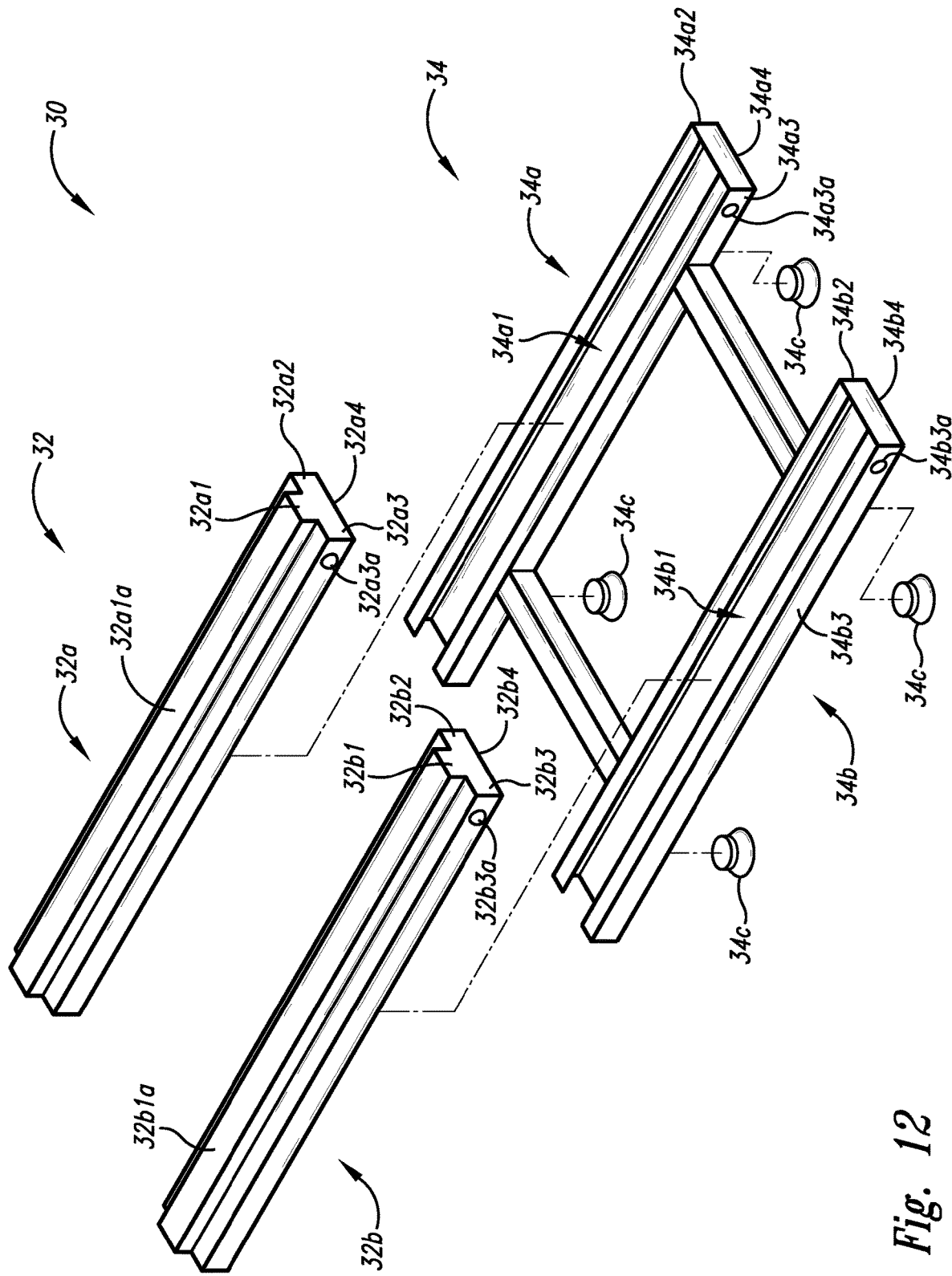
FIG. 12 is an exploded top perspective view of a coupler assembly for vehicle mountable article dryer system.

Turning to FIG. 12, depicted therein is an exploded top perspective view of coupler assembly 30. Depicted implementation of coupler assembly 30 is shown to include dryer coupling assembly 32 and vehicle coupling assembly 34. Depicted implementation of dryer coupling assembly 32 is shown to include elongated T-shaped member 32a and elongated T-shaped member 32b. Depicted implementation of elongated T-shaped member 32a is shown to include vertical portion 32a1 having top surface 32a1a, horizontal portion 32a2, horizontal portion 32a3 with spring-loaded pin 32a3a, and bottom surface 32a4. Depicted implementation of elongated T-shaped member 32b is shown to include vertical portion 32b1 having top surface 32b1a, horizontal portion 32b2, horizontal portion 32b3 with spring-loaded pin 32b3a, and bottom surface 32b4. Depicted implementation of vehicle coupling assembly 34 is shown to include rail member 34a, rail member 34b, and a plurality of couplers 34c. In implementations, couplers 34c are coupled to rail member 34a and rail member 34b and can utilize magnetic, suction (e.g., suction cups, etc.), adhesive, hook-and-loop, or other coupling methods for coupling the coupler assembly with an exterior surface of a vehicle such as an exterior portion of the vehicle's rooftop, side, hood, etc. (not shown).

Depicted implementation of rail member 34a is shown to include central opening 34a1, side 34a2, side 34a3 with aperture 34a3a, and bottom 34a4. Depicted implementation of rail member 34b is shown to include central opening 34b1, side 34b2, side 34b3 with aperture 34b3a, and bottom 34b4. As T-shaped member 32a and T-shaped member 32b are inserted into rail member 34a and rail member 34b, respectively, spring-loaded pin 32a3a and spring-loaded pin 32b3b are depressed. Upon T-shaped member 32a and T-shaped member 32b being fully inserted into rail member 34a and rail member 34b, respectively, due to their spring-loading, spring-loaded pin 32a3a and spring-loaded pin 32b3a will extend through aperture 34a3a and aperture 34b3a, respectively.

Figure 13:
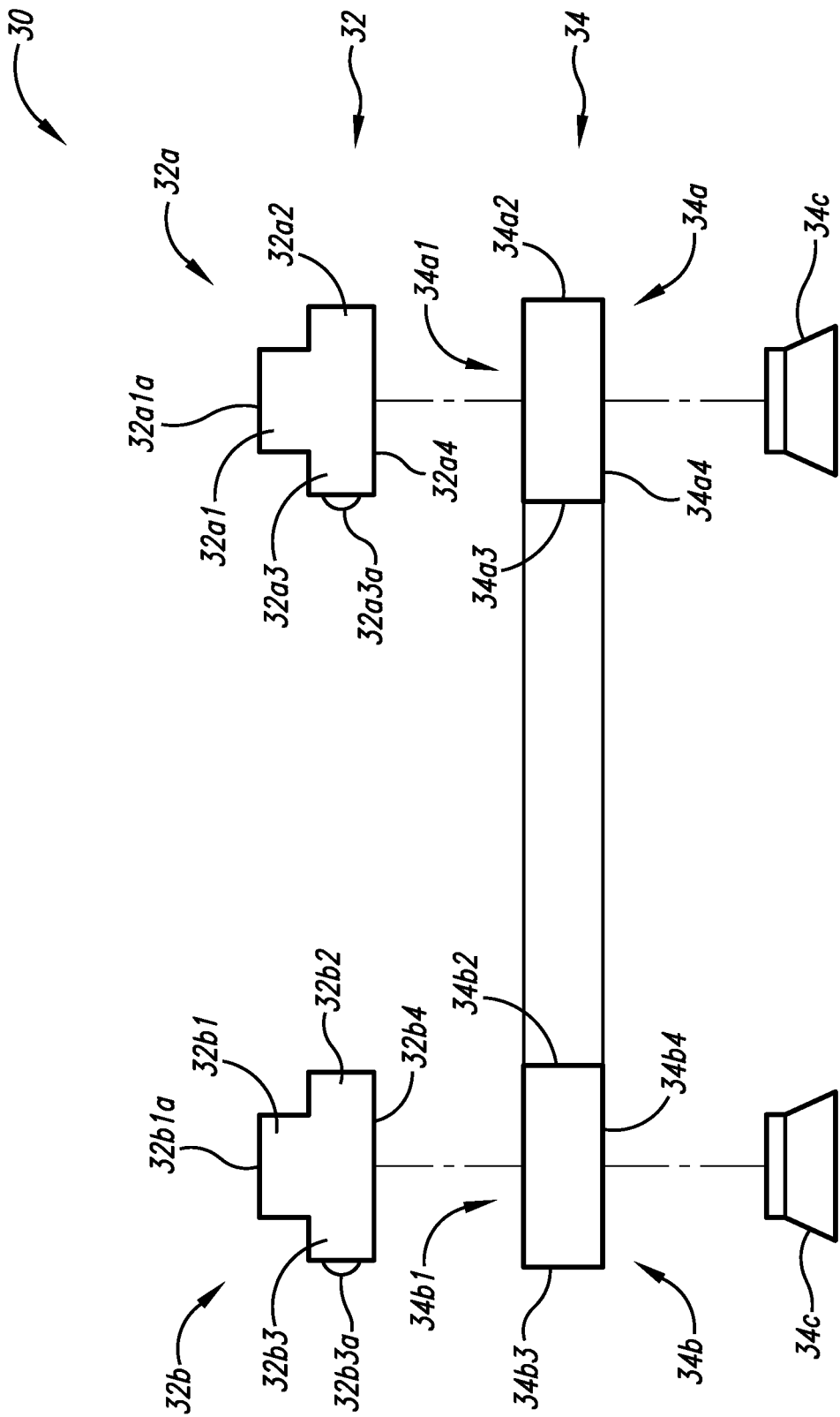
FIG. 13 is an exploded front-elevational view of the coupler assembly of FIG. 12.

Turning to FIG. 13, depicted therein is an exploded front-elevational view of coupler assembly 30.

Figure 14:
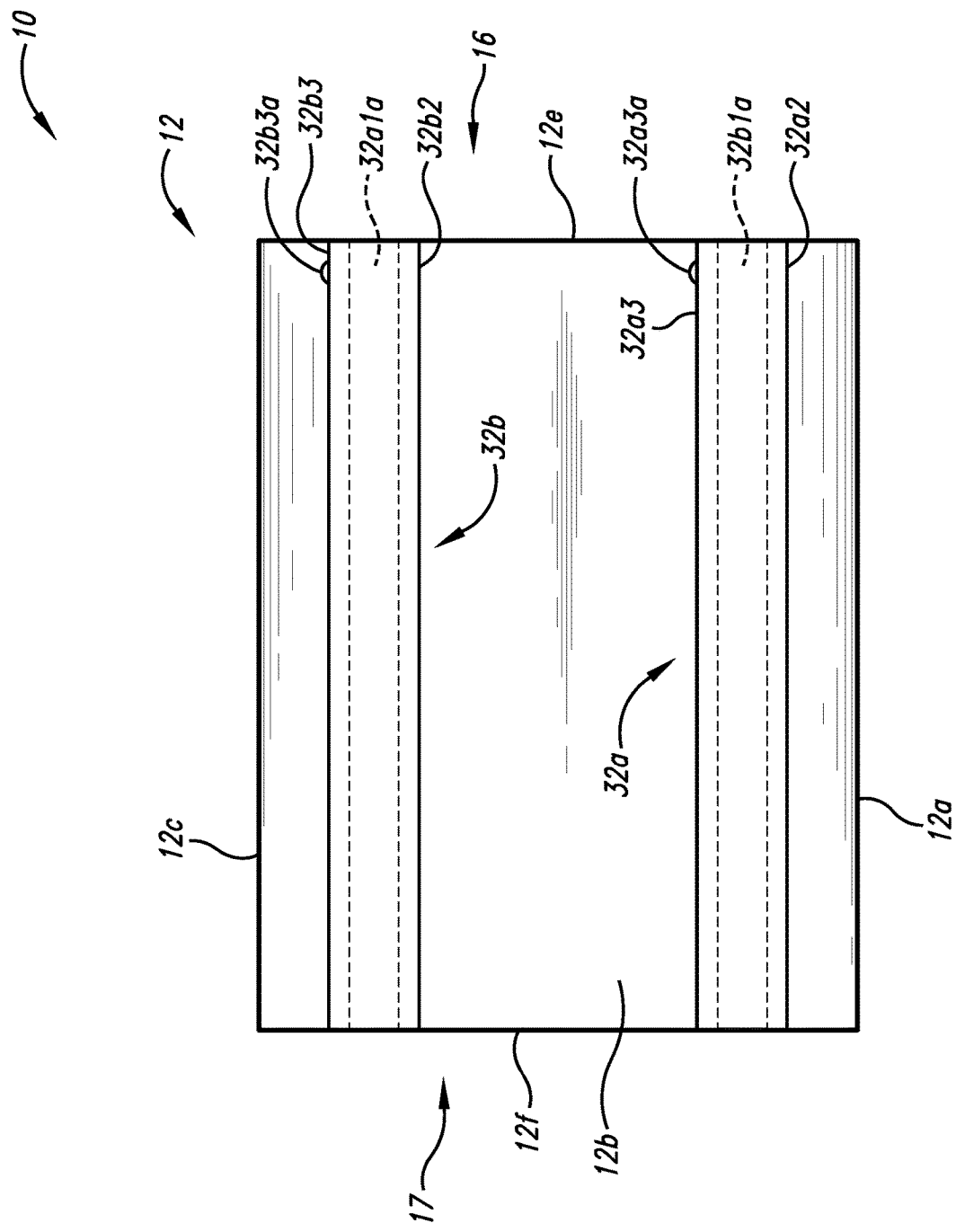
FIG. 14 is bottom plan view of the vehicle mountable article dryer system of FIG. 1 partially coupled with a portion the coupler assembly of FIG. 12.

Turning to FIG. 14, depicted therein is a bottom plan view of vehicle mountable article dryer system 10 partially coupled with a portion of coupler assembly 30.

Figure 15:
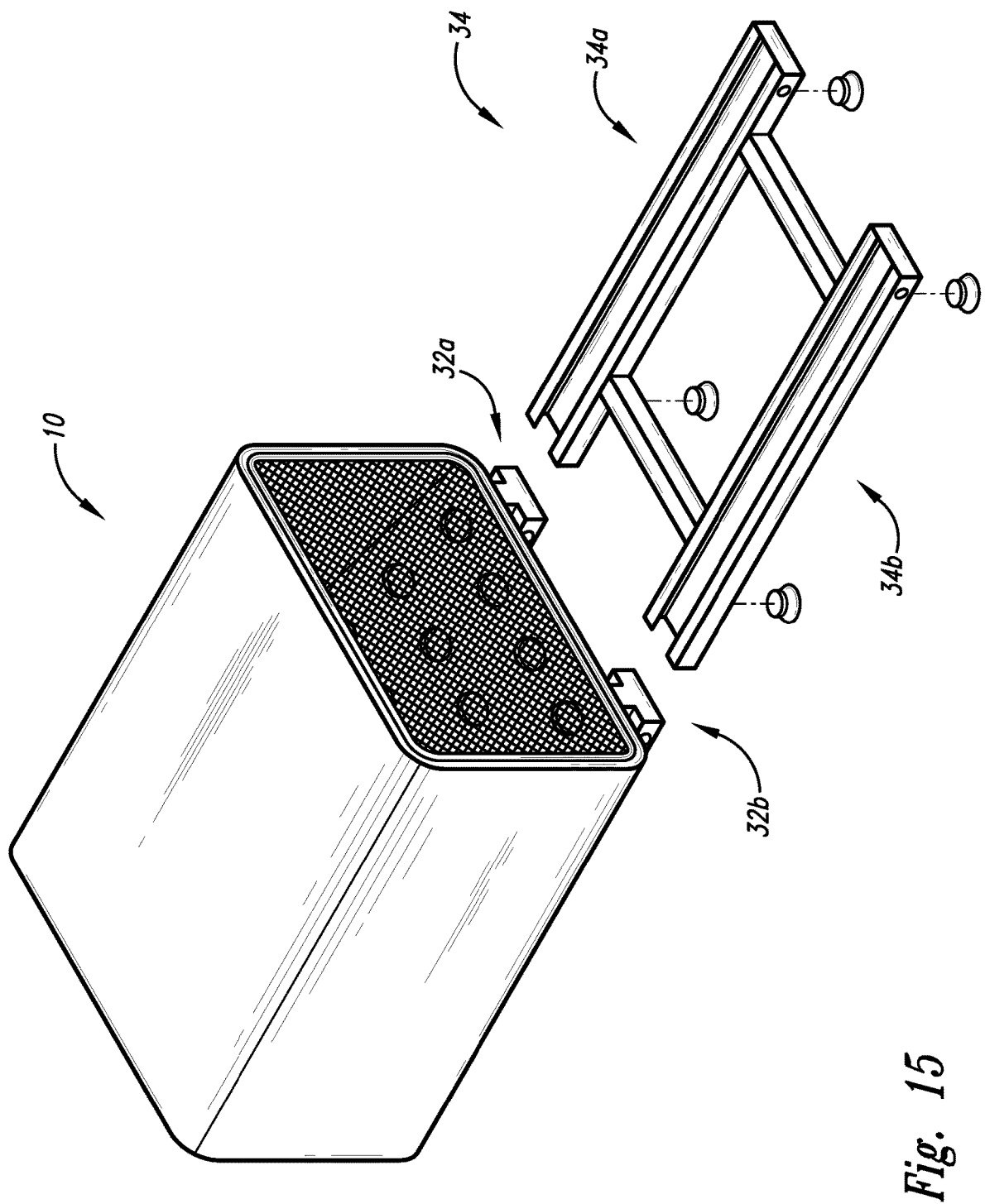
FIG. 15 is a partially exploded top perspective view of the vehicle mountable article dryer system of FIG. 1 partially coupled with the coupler assembly of FIG. 12.

Turning to FIG. 15, depicted therein is a partially exploded top perspective view of vehicle mountable article dryer system 10 partially coupled with a portion of coupler assembly 30.

Figure 16:
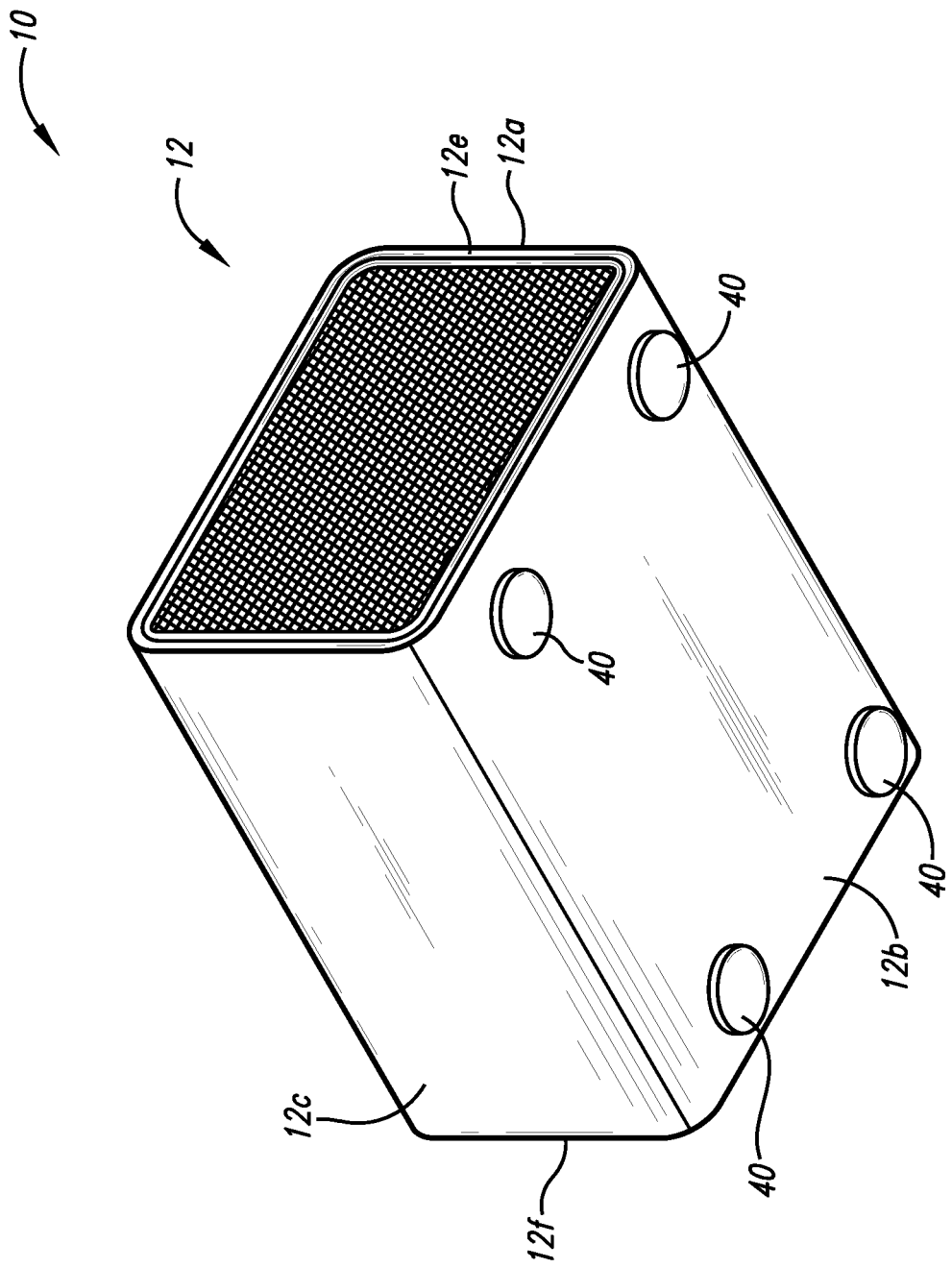
FIG. 16 is a bottom perspective view of the vehicle mountable article dryer system of FIG. 1 coupled with a plurality of couplers for coupling with an exterior of a vehicle (not shown).

Turning to FIG. 16, depicted therein is a bottom perspective view of vehicle mountable article dryer system 10 with bottom portion 12b coupled with a plurality of couplers 40, which in implementations can be magnetic, suction (e.g., suction cups, etc.), adhesive, hook-and-loop, or other direct-coupling based to couple with an exterior surface of a vehicle such as an exterior portion of the vehicle's rooftop, side, hood, etc. (not shown).

Figure 17:
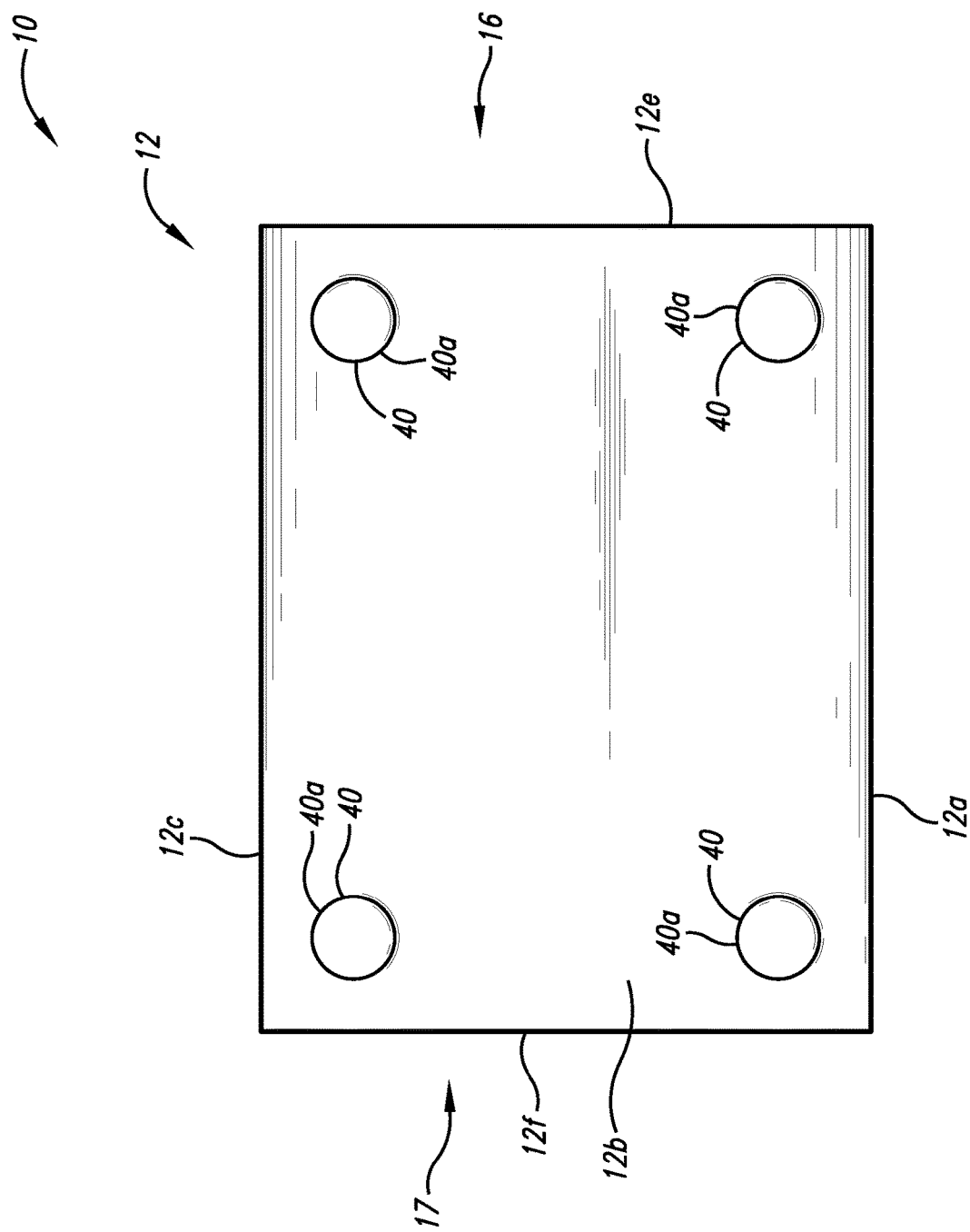
FIG. 17 is a bottom plan view of the vehicle mountable article dryer system of FIG. 1 coupled with the plurality of couplers as recessed magnets for coupling with an exterior of a vehicle (not shown).

FIG. 17 is a bottom plan view of an implementation of vehicle mountable article dryer system 10 with bottom portion 12b coupled with the plurality of couplers 40 as recessed magnets 40a that are recessed into bottom portion 12b for coupling with an exterior surface of a vehicle such as an exterior portion of the vehicle's rooftop, side, hood, etc. (not shown).

Figure 18:
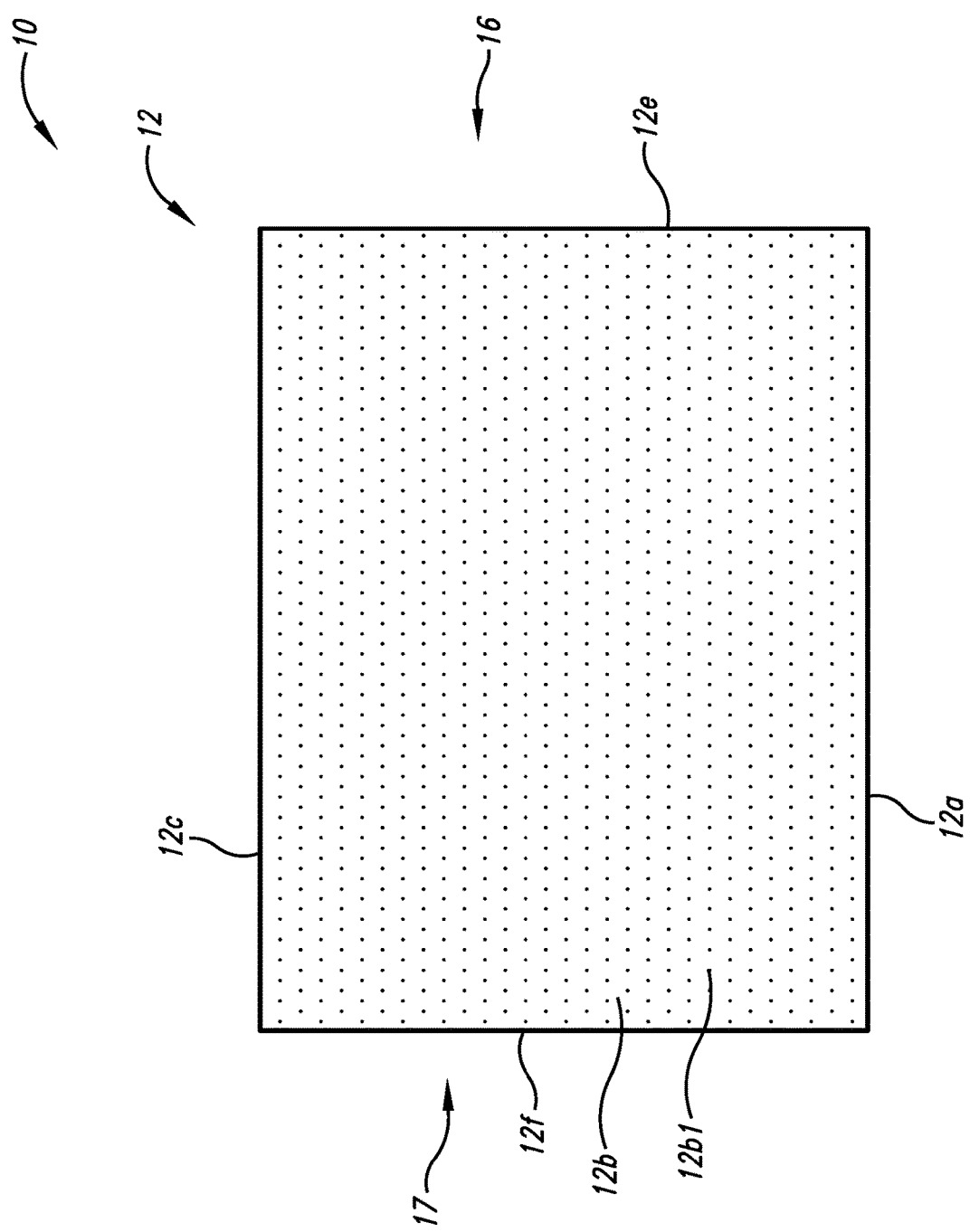
FIG. 18 is a bottom plan view of the vehicle mountable article dryer system of FIG. 1 with bottom portion coupled with a plurality of couplers as the recessed magnets (shown in FIG. 17) that are hidden by a fabric-material cover.

FIG. 18 is a bottom plan view of an implementation of the vehicle mountable article dryer system 10 in which bottom portion 12b is coupled with plurality of couplers 40 as recessed magnets 40a (shown in FIG. 17) that are hidden by fabric-material cover 12b1 for coupling with an exterior of a vehicle such as an exterior portion of the vehicle's rooftop, side, hood, etc. (not shown) such that when vehicle mountable article dryer system 10 is so coupled, fabric material cover 12b1 is positioned between recessed magnets 40a and the exterior of the vehicle such as an exterior portion of the vehicle's rooftop, side, hood, etc. (not shown).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An article dryer system for removably coupling to an exterior of a vehicle, the article dryer system comprising:

(I) a multi-sided single-piece tubular structure including an interior area, an inlet opening and an outlet opening oppositely facing the inlet opening;

(II) a divider panel positioned in the interior area, extending from a first side portion of the multi-sided tubular structure to a second side portion of the multi-sided tubular structure, wherein the divider panel includes a first portion extending from the first side portion to the second side portion and a second portion extending from the first side portion to the second side portion, wherein the first portion of the divider panel is positioned closer to the inlet opening of the multi-sided tubular structure than the second portion of the divider panel is positioned to the inlet opening of the multi-sided tubular structure, wherein the second portion of the divider panel is positioned closer to the outlet opening of the multi-sided tubular structure than the first portion of the divider panel is positioned to the outlet opening of the multi-sided tubular structure, and wherein the second portion of the divider panel is positioned closer to a top portion of the multi-sided tubular structure than the first portion of the divider panel is positioned from the top portion of the multi-sided tubular structure; and (III) at least one coupler for removably coupling with the exterior of the vehicle, wherein the at least one coupler is coupled to a bottom portion of the multi-sided tubular structure.

2. The article dryer system of claim 1 further including a porous cover removably coupled to the receptacle assembly and at least partially positioned in the inlet opening.

* * * * *